(12) United States Patent
Zhou et al.

(10) Patent No.: US 9,503,582 B2
(45) Date of Patent: *Nov. 22, 2016

(54) VOICE TRANSCRIPTION

(71) Applicant: Comcast Cable Communications, LLC, Philadelphia, PA (US)

(72) Inventors: Tong Zhou, Lower Gwynedd, PA (US); Matthew Sirawsky, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,935

(22) Filed: Aug. 7, 2015

(65) Prior Publication Data

US 2016/0072951 A1 Mar. 10, 2016

Related U.S. Application Data

(63) Continuation of application No. 14/184,024, filed on Feb. 19, 2014, now Pat. No. 9,137,374, which is a continuation of application No. 13/345,968, filed on Jan. 9, 2012, now Pat. No. 8,699,677.

(51) Int. Cl.
| | |
|---|---|
| *H04M 11/00* | (2006.01) |
| *H04M 3/53* | (2006.01) |
| *G10L 15/26* | (2006.01) |
| *H04M 11/10* | (2006.01) |
| *H04M 3/533* | (2006.01) |
| *H04W 4/12* | (2009.01) |
| *G10L 15/28* | (2013.01) |

(52) U.S. Cl.
CPC ............ *H04M 3/5307* (2013.01); *G10L 15/26* (2013.01); *H04M 3/533* (2013.01); *H04M 3/53358* (2013.01); *H04M 11/10* (2013.01); *H04W 4/12* (2013.01); *G10L 15/28* (2013.01)

(58) Field of Classification Search
CPC ................ H04M 2201/60; H04M 2203/4536; H04M 3/5307; H04M 3/42382
See application file for complete search history.

(56) References Cited

U.S. PATENT DOCUMENTS

| | | | |
|---|---|---|---|
| 6,085,231 A | 7/2000 | Agraharam et al. | |
| 6,507,643 B1 | 1/2003 | Groner | |
| 6,587,871 B1 | 7/2003 | Schrader | |
| 6,788,769 B1 | 9/2004 | Waites | |
| 7,046,771 B2 | 5/2006 | Dalrymple | |
| 7,103,154 B1 | 9/2006 | Cannon et al. | |
| 7,133,504 B2 | 11/2006 | Fostick | |
| 7,603,379 B2 * | 10/2009 | Kang | H04L 12/58 |
| 8,249,568 B2 | 8/2012 | Salmon | |
| 2001/0041578 A1 * | 11/2001 | Na | H04M 3/5322 455/466 |
| 2002/0159572 A1 * | 10/2002 | Fostick | H04L 12/5835 379/88.14 |
| 2005/0255837 A1 * | 11/2005 | Kwon | H04M 1/6505 455/414.4 |
| 2008/0065378 A1 * | 3/2008 | Siminoff | G10L 15/26 704/235 |
| 2010/0029250 A1 * | 2/2010 | Gupta | H04M 3/537 455/413 |
| 2013/0136246 A1 * | 5/2013 | Abramskiehn | H04M 3/42051 379/201.01 |

* cited by examiner

*Primary Examiner* — Simon Sing

(74) *Attorney, Agent, or Firm* — Banner & Witcoff, Ltd.

(57) ABSTRACT

Methods, systems, computer readable media, and apparatuses for voice data transcription are provided. Packets that include voice data may be received and for each time that a threshold amount of voice data is received, a segment of voice data may be created and transcribed to text. A message that includes the transcribed text may then be transmitted to an intended recipient of the voice data, to allow the intended recipient to view the message prior to transcription of the remaining segments of the voice data. Additionally, subsequent to transmission of the message, another message may be transmitted that includes text transcribed from a different segment of the voice data.

20 Claims, 6 Drawing Sheets

VOICE TRANSCRIPTION

CROSS-REFERENCE TO RELATED APPLICATIONS

This application is a continuation of co-pending U.S. application Ser. No. 14/184,024, filed on Feb. 2, 2014, which is a continuation of U.S. application Ser. No. 13/345,968, filed on Jan. 9, 2012 (now U.S. Pat. No. 8,699,677). Each of the above-mentioned applications is incorporated herein by reference in its entirety.

BACKGROUND

Speech-to-text transcription services can convert a voice mail to text and deliver it to the intended recipient through e-mail or text message. Conventionally, voice mail recording and voice transcription are separate processes that occur in series. For example, to record a voice message, voice data may be received in a certain format, converted to a further compressed format such as Global System for Mobile Communications (GSM), and stored in a WAV file, which refers to the Waveform Audio File Format developed by Microsoft and IBM. Upon completion of the recording, compressed voice data may be transmitted for transcription. Upon receipt of the compressed voice data for transcription, the compressed voice data may be converted to a different format such as G.711 of the Telecommunication Standardization Sector (ITU-T), which is a sector of the International Telecommunication Union (ITU). The voice data may then be transcribed to readable text. The processes of recording the voice message and converting the voice message to text causes a delay between completion of the voice mail and transmission of the converted text to the intended recipient. Additionally, because the voice message is compressed for storage and then later converted to another format (e.g., an uncompressed format) for transcription, audio quality may be degraded, which reduces accuracy of the transcription. Thus, there is an ever present need to reduce delay in transmitting text transcribed from voice data to its intended recipient and increase transcription accuracy.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods and systems for transcribing voice data to text. In one or more arrangements, a stream of voice data may be received and voice data segments may be created from the voice data. Each segment may be transcribed to text and a message for each segment's text may be created and transmitted for viewing by an intended recipient of the voice data. In some arrangements, transcription of each segment may be performed separately from the transcription of the other segments, and each message may be transmitted at a different time.

In some embodiments, packets that include voice data for a voicemail message may be received and it may be determined that a threshold amount of voice data has been received. Responsive to determining that a threshold amount of voice data has been received, a segment that includes the threshold amount of the voice data may be created and transcribed to text. A message that includes the transcribed text may then be transmitted to an intended recipient of the voicemail message. Additionally, subsequent to transmission of the message, another message may be transmitted that includes text transcribed from a different segment of the voicemail's voice data.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
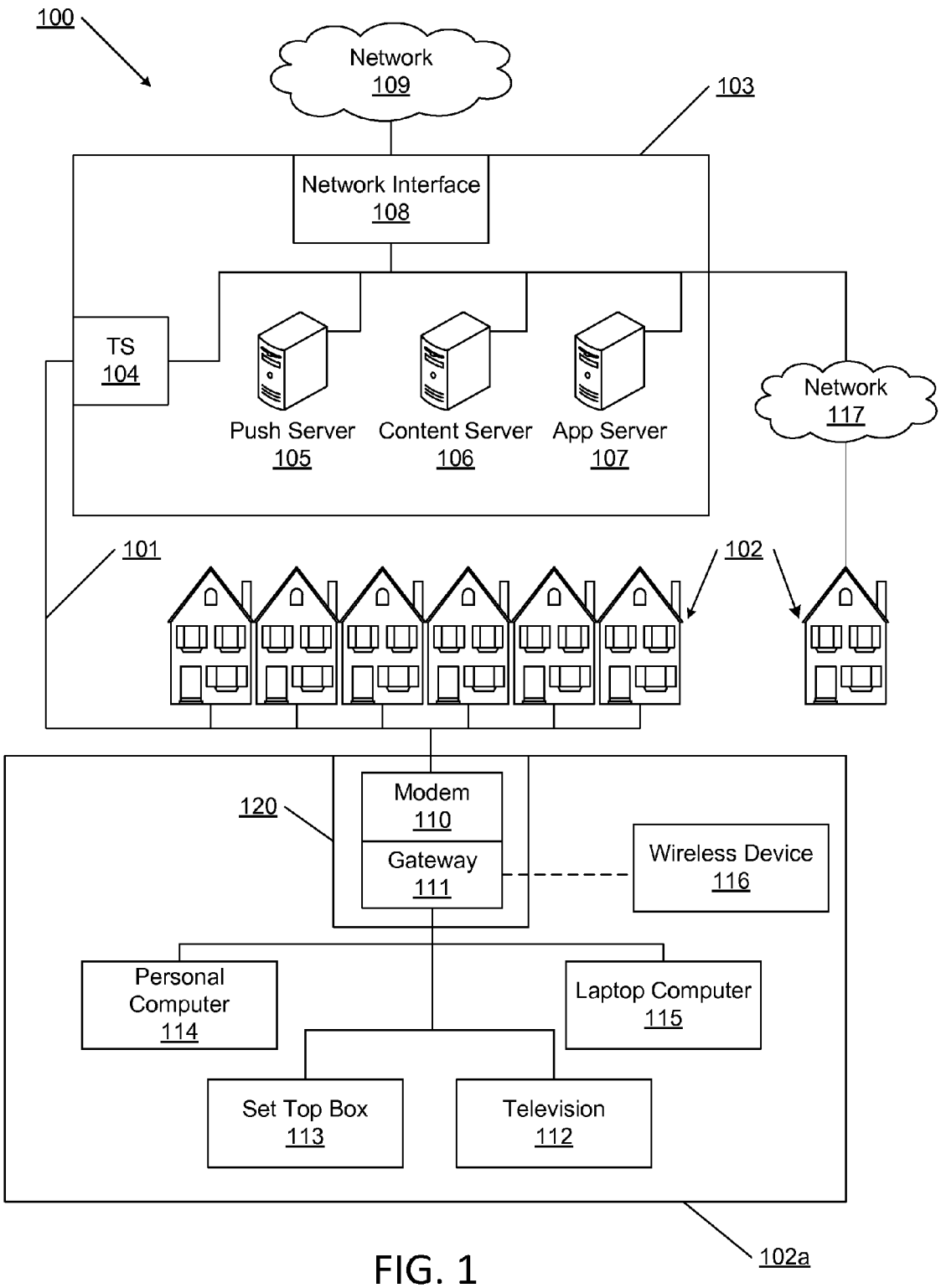
FIG. 1 illustrates an example information distribution network according to one or more aspects described herein.

FIG. 1 illustrates an example information distribution network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Such networks 100 may use a series of interconnected communication channels 101 (e.g., coaxial cables, optical fibers, wireless, etc.) to connect an end-point to a central office or headend 103. Example end-points are illustrated in FIG. 1 as premises 102 (e.g., businesses, homes, consumer dwellings, etc.). The central office 103 may transmit information signals onto the lines 101, and each premises 102 may have a receiver used to receive and process those signals. In some arrangements, the end-points may be connected to the central office 103 by another network 117 (e.g., the Internet).

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in a HFC network, which may be a computing device configured to manage communications between devices on the network of lines 101 and one or more backend devices, such as servers 105-107 (examples of which are to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. As illustrated in FIG. 1, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.). Additional examples of servers that may be configured to perform various functions will be discussed below in connection with FIG. 3.

Referring again to FIG. 1, an example premises 102*a* may include an interface 120. The interface 120 may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The interface 120 may also include a gateway interface device 111 or gateway. The modem 110 may be connected to, or be a part of, the gateway interface device 111. The gateway interface device 111 may be a computing device that communicates with the modem 110 to allow one or more other devices in the premises to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the premises, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
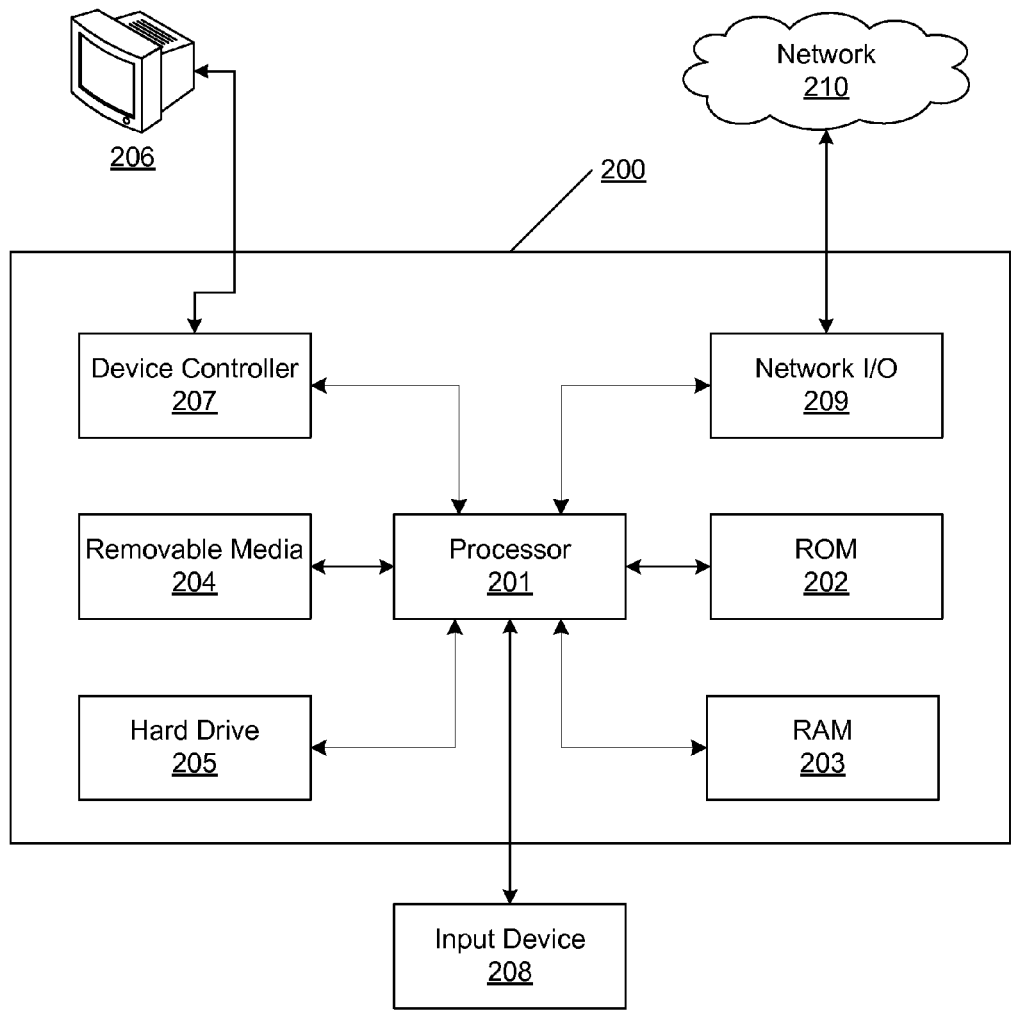
FIG. 2 illustrates an example computing device on which the various elements described herein may be implemented according to one or more aspects described herein.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the one or more processors 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the input/output circuits 209 may include a modem (e.g., a cable modem), and network 210 may include the communication channels of the networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic components and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 3:
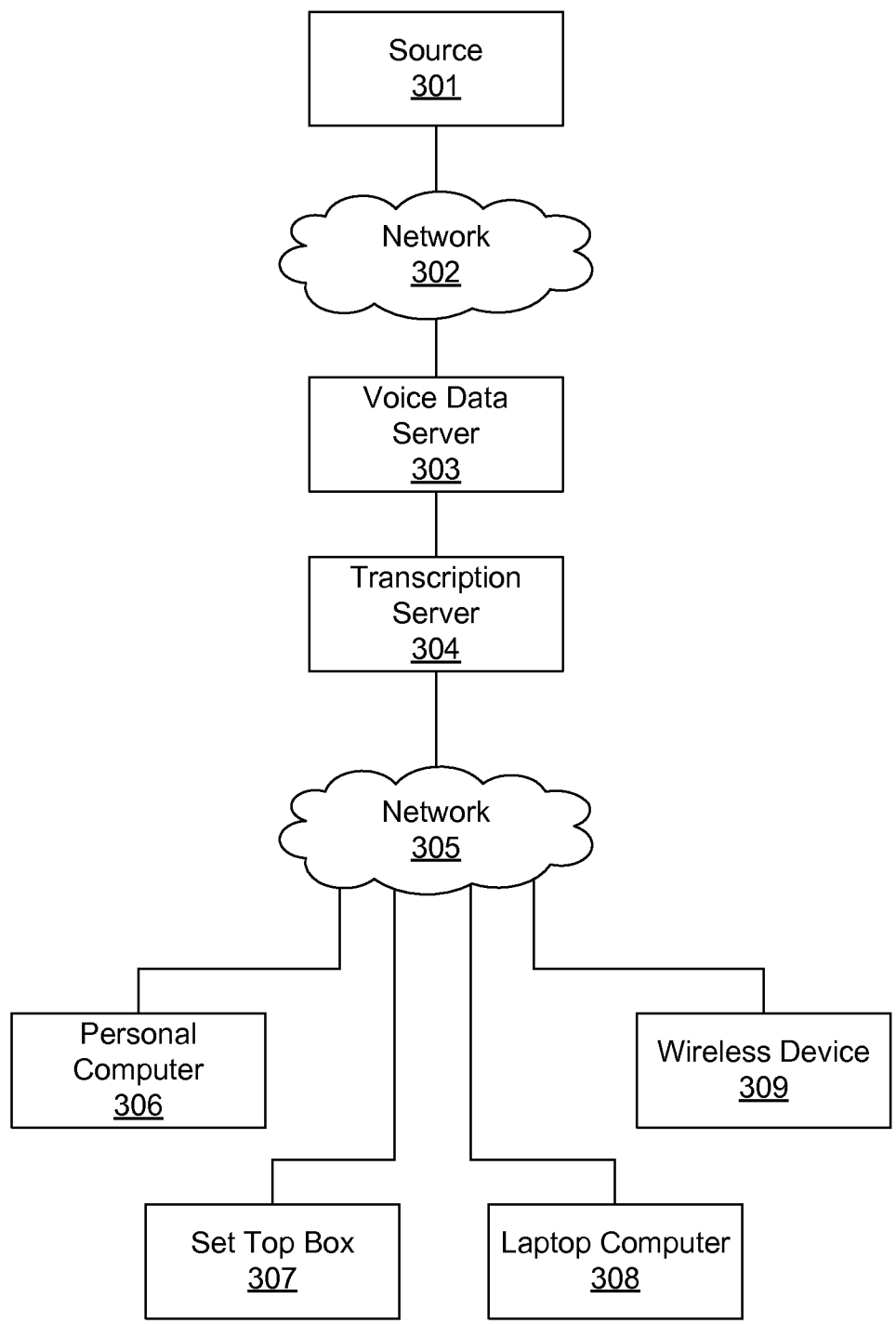
FIG. 3 illustrates an example arrangement of devices for providing transcriptions of data to one or more user devices according to one or more aspects described herein.

In some arrangements, textual data that represents a transcription of voice data may be provided from the central office or a server to one or more user devices. FIG. 3 illustrates an example arrangement of devices for providing transcriptions of data to one or more user devices. As illustrated in FIG. 3, a source 301 of the voice data may be connected to a voice data server 303 via network 302. Source 301 may be any suitable device capable of transmitting audio data. In some arrangements, the source 301 may be a device, such as a telephone, cellular phone, personal computer, laptop computer, or other device, that includes a microphone or other suitable device for receiving audio directly from a person. For example, source 301 may be a telephone and a person may have initiated a telephone call to an intended recipient. If the call is not answered by an intended recipient, the call may be connected to the voice data server 303 to allow the caller to leave a voice message. As another example, source 301 may be a computing device managing a teleconference or another type of live event, and audio of the teleconference may be transmitted to the voice data server 303.

Figure 4A:
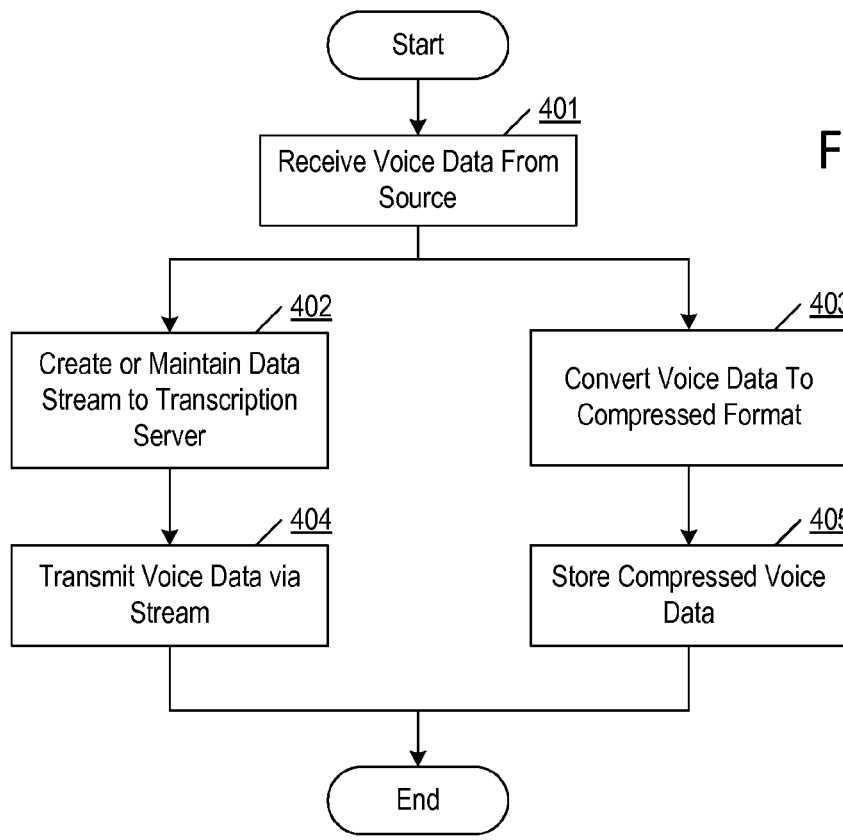
FIG. 4A illustrates an example method of receiving data from a source device and transmitting data for transcription according to various aspects described herein.

Upon receiving the voice data from source 301, voice data server 303 may be configured to process the received data and transmit data to transcription server 304. FIG. 4A illustrates an example method of receiving data from a source device 301 and transmitting data for transcription. At step 401, voice data may be received from a source device 301. In some arrangements, the voice data may be received via one or more packets that include audio in an uncompressed format, such as G.711 or wideband voice (e.g., G.722, another standard of the ITU-T). In response to receiving the voice data, the voice data server 303 may perform two processes via parallel processing or separate threads. One process is illustrated by steps 403 and 405. At step 403, the voice data may be converted from its uncompressed format to a compressed format, such as GSM. At step 405, the compressed voice data may be stored. The process represented by steps 403 and 405 may be performed in real-time or as the voice data is received at the voice data server. Accordingly, steps 403 and 405 may be repeated as needed or whenever one or more packets are received at the voice data server 303.

In some arrangements, the voice data server 303 may be configured to allow access to the stored data. For example, if some embodiments where the voice data is a voicemail, a user may access a voicemail account in order to retrieve the compressed voice data from storage, cause decompression of the compressed voice data, and listen to the voicemail. A user may be allowed to delete data from storage or cause data to be saved in the storage for a specified time.

The second process performed by the voice data server is illustrated by step 402. At step 402, the voice data server 303 may create or maintain a data stream in a transcription server 304. At step 404, the voice data server 303 may transmit the voice data via the stream to the transcription server 304. In some arrangements, the voice data may be transmitted in an uncompressed format and/or may be transmitted in the same format as was received at step 401 (e.g., in G.711 format, G.722 format, or the like). Thus, in some instances, the voice data server 303 may be forwarding packets received at step 401 to the transcription server 304 via the stream without compressing or otherwise converting the received data into another format. The process represented by steps 402 and 404 may be performed in real-time or as the voice data is received at the voice data server 303. Accordingly, steps 402 and 404 may be repeated as needed or whenever one or more packets are received at the voice data server 303.

As illustrated in FIG. 4A, the processing of the voice mail message into an attached audio file and the transcription may occur simultaneously. For example, one processor and/or processing thread may transcribe the message while another processor and/or processing thread formats the message, e.g., to attach to an e-mail. Where the message is over a predetermined threshold, e.g., 2, 4, 6, 8, or 10 seconds, the message may be segmented such that transcription occurs on each segment while the overall recording is saved for processing such as attaching to an e-mail. The segmentation can occur at predetermined times and/or at locations such as word boundaries to better facilitate the transcription. Where segmentation occurs at predetermined times and the transcription later determines that the segmentation was in the middle of a word, the transcription process buffers the portion of the audio crossing word boundaries and then continues processing when the next segment is received. In Voice over Internet Protocol (VoIP) systems where silences between words are suppressed and a null code is inserted in the voice stream, the segmentation can occur on detection of the null code. In some embodiments, the processes are preformed in a multi-threaded multi-core processor where different processes (e.g., formatting/compression as one process and transcription as another process) are preformed on different processors. Alternatively, the different processes can occur on different servers either co-located and/or in physically separate locations. The use of the multi-path data flows and/or multi-threaded processing allows voice mails with transcription to be forwarded without significant delays.

Further, an option can be presented where the system can train to recognize the voice of a particular caller. For example, when setting up a voice mail system, a user can be requested to speak certain training words. These words and training data can then be saved and associated with the user. When that user then leaves a message for another user (e.g., another user at the same organization), the training data may be applied against the message to transcribe the message. The translation may be performed using any suitable mechanism such as hidden Markov models and/or dynamic time warping. In yet further aspects, the training data may be stored in a file at a central translation server and/or distributed to other translation servers in the same and/or different companies. Security protocols may be overlaid on the training data which allow the user and/or system administrator to allow access to the training data to one or more processes and/or servers.

Referring again to FIG. 3, transcription server 304 may be configured to receive data from a voice data server 303, process the received data, transcribe voice data and transmit text to one or more user devices (e.g., personal computer 306, set top box 307, laptop computer 308, wireless device 309, etc.) or another computing device so that the text may be accessed by the intended recipient.

Figure 4B:
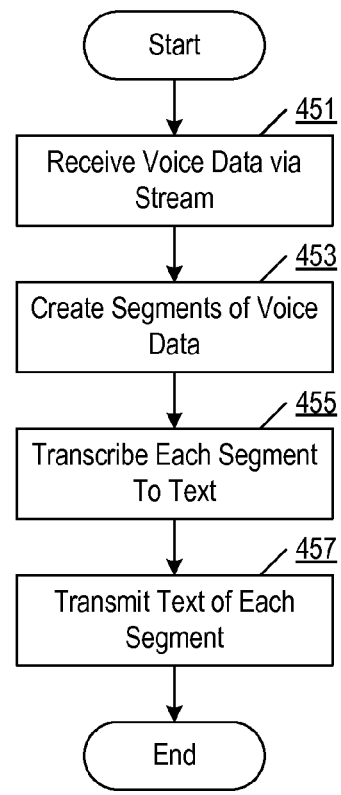
FIG. 4B illustrates an example method of transcribing data to text and transmitting the text to a user device according to various aspects described herein.

FIG. 4B illustrates an example method of transcribing data to text and transmitting the text to a user device. At step 451, voice data may be received via a data stream from a voice data server 303. In some arrangements, the received voice data may be in an uncompressed format. At step 453, segments of the received voice data may be created. A segment, as will be discussed more fully below, may be a particular size of data (e.g., bytes or kilobytes) or a particular length in time of voice data (e.g., seconds or tens of seconds) and/or a particular number of words/phonemes. In some arrangements, a segment may be created when a threshold amount of the voice data has been received by the transcription server 305. At step 455, each segment may be transcribed to text. At step 457, the text of each segment may be transmitted. For example, the transcription of each segment may be transmitted to a user device via short message service (SMS), e-mail, or instant message (e.g., via a message conforming to Extensible Messaging and Presence Protocol (XMPP)) in order for an intended recipient to view the text of each transcription. In some arrangements, the text corresponding to each segment may be transmitted in response to completion of the segment's transcription. Accordingly, a user device may receive multiple transmissions of text, where each transmission includes a transcription of one of the segments.

Figure 5:
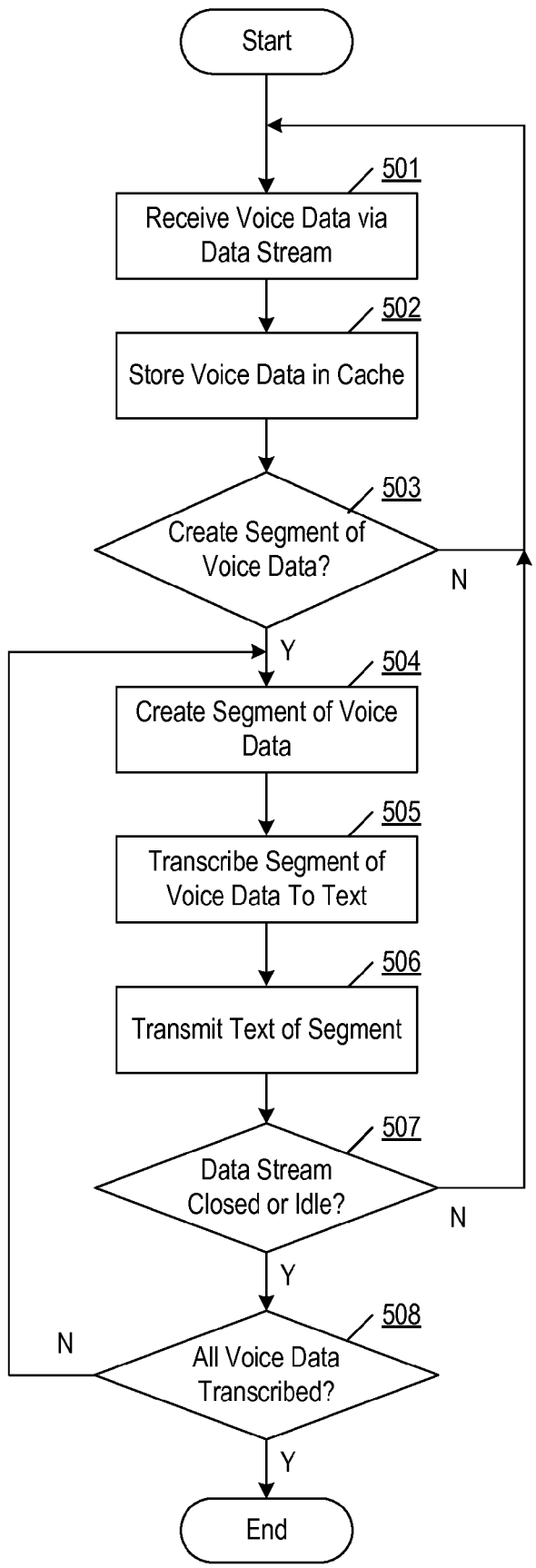
FIG. 5 illustrates an example method of transcribing a stream of data in segments according to one or more aspects described herein.
Figure 6:
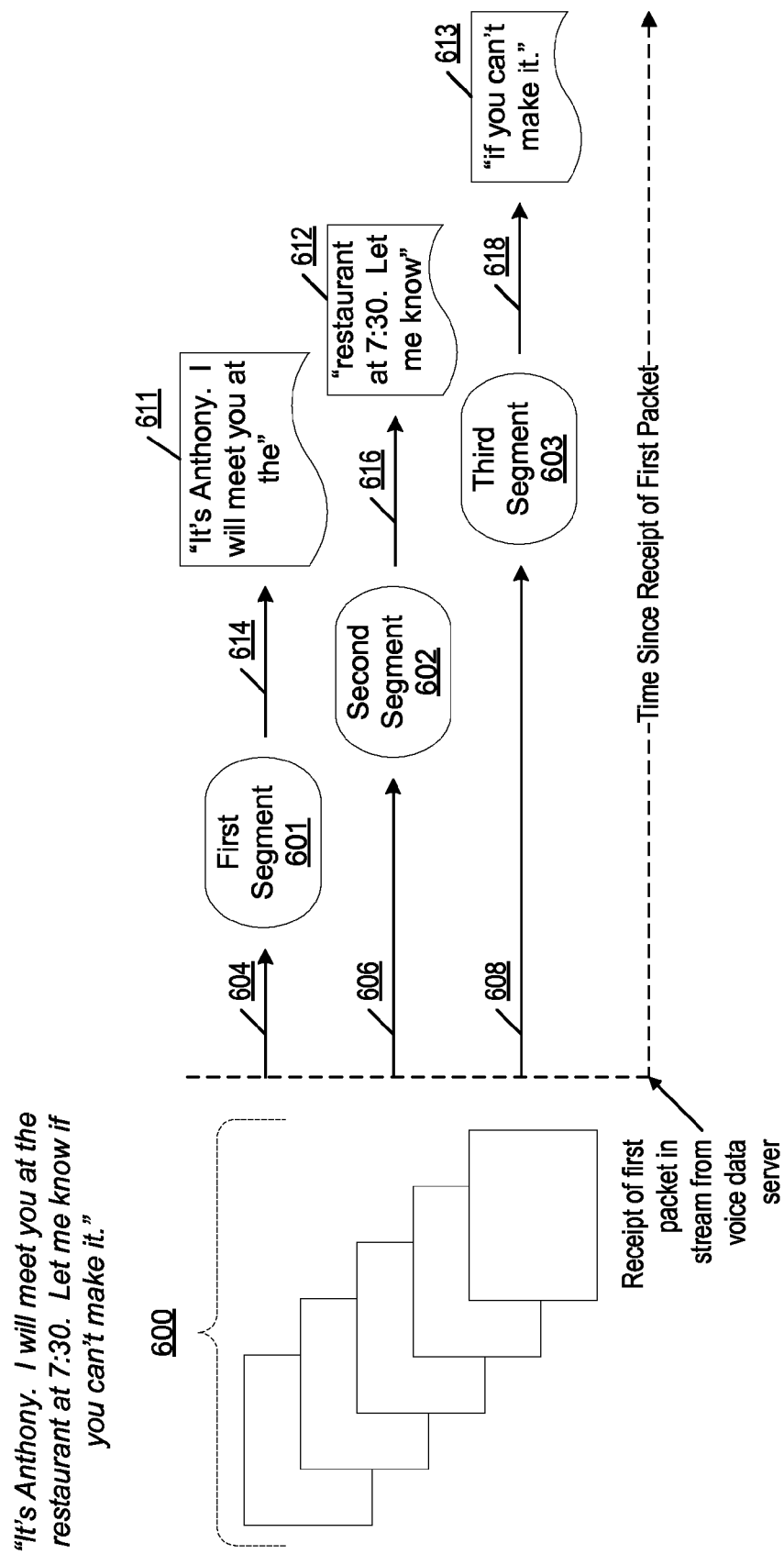
FIG. 6 provides an example illustration of data being transcribed and transmitted in segments according to various aspects described herein.

A more detailed example of transcribing voice data by use of segments will be described in connection with FIGS. 5 and 6. In particular, FIG. 5 illustrates an example method of transcribing a stream of data in segments. FIG. 6 provides an example illustration of data being transcribed and transmitted in segments. The example of FIG. 6 will be described in conjunction with the example method of FIG. 5.

Referring to FIG. 5, at step 501, voice data may be received via a data stream. In some arrangements, the data stream may be between a voice data server 303 and a transcription server 304. In some arrangements, the voice data may be received via or more packets, such as packets 600 of FIG. 6, which include uncompressed voice data streamed from a voice data server 303. As illustrated by FIG. 6, packets 600 represent a voice message of: "It's Anthony. I will meet you at the restaurant at 7:30. Let me know if you can't make it."

At step 502 of FIG. 5, the voice data received via the data stream may be stored in a cache of the transcription server 304. Storing the voice data may include decapsulating or otherwise extracting the voice data from the packets and storing the uncompressed voice data for later access. In some variations, other processing may also be performed. For example, transcription pre-processing may be performed to identify possible occurrences of words within the voice data and/or instances in the voice data where a person is not speaking. Various information related to the voice data may also be stored, such as data identifying the source of the voice data (e.g., name or number of the caller), data identifying the destination of the voice data (e.g., the name or number of the intended recipient), etc.

At step 503, it may be determined whether to create a segment of voice data. To determine whether to create a segment of voice data, the transcription server 304 may monitor the voice data received via the data stream and/or the data stored in its cache, and may form this determination based on various criteria. In some arrangements, it may be determined to create a segment when a threshold amount of voice data has been received or stored and that voice data has not yet been transcribed. The threshold amount could be based on a time threshold (e.g., has 5 seconds of voice data been received or stored?), based on a size threshold (e.g., has 10 kilobytes of voice data been received or stored?), or based on a number of words (e.g., have 12 words been received or stored?).

The types of criteria and their respective values may be defined in a system or user profile. For example, a system operator may create a system profile that defines the various thresholds and criteria to use when determining whether to create a segment. Additionally or alternatively, a user may create a user profile that defines the various thresholds and criteria to use/compare when determining whether to create a segment. Accordingly, the user or system profiles may be used to tune the transcription server 304 to create larger or smaller segments. For example, if a user is willing to experience larger delays, the user may create or modify the user profile to define criteria for creating larger or longer segments (e.g., segments of 100 kilobytes of voice data, 20 seconds of voice data, or 30 words). If a user wishes to receive text under shorter delays, the user profile may be created or modified to define criteria for creating smaller or shorter segments (e.g., segments of 1 kilobyte of voice data, 2 seconds of voice data, or 5 words).

If it is determined to create a segment of voice data, the method may proceed to step 504. Otherwise, the method may return to step 501 to continue receiving voice data via the data stream and storing the voice data. Further, in some variations, if it is determined to create a segment of voice data, the transcription server 304 may create a new thread for performing the segment creation, segment transcription and transcription transmission (e.g., steps 504-506). This new thread may exist until its segment has been transcribed and successfully transmitted to the user device. Thus, a thread may exist for each segment that is currently being transcribed and has not yet been successfully transmitted to the user device. By creating a thread for each segment, the processing and transcription of each segment may be performed separately from other segments. For example, with respect to the illustration of FIG. 6, the processing of first segment 601 may be performed by a first thread, the processing of second segment 602 may be performed by a second thread, and the processing of third segment 603 may be performed by a third thread. In these arrangements, steps 501, 502, 503, 507 and 508 may be performed by a supervisor thread, and upon creating a new thread for a new segment, the supervisor thread may proceed to step 507. Therefore, voice data may continue to be received and stored, while segments are being transcribed and transmitted.

At step 504, a segment may be created. In some embodiments, a segment may include voice data in uncompressed form and/or voice data that was retrieved from the cache of the transcription server 304. The particular amount of voice data included in a segment depends on the criteria being used to determine whether to create a segment. For example, if it is determined that 10 kilobytes of voice data has been received or stored and that the 10 kilobytes of voice data has not been transcribed, the segment may be created to include the 10 kilobytes of voice data.

Additionally, creating the segment may include analyzing the boundary of the segment and/or the boundaries of adjacent segments. In some instances, a spoken word may be divided between two segments, which can negatively affect transcription quality. To compensate for this, the transcription server 304 may determine whether a segment boundary would divide a word and/or move a segment boundary such that the word is not divided between two segments. In some variations, the boundary may be moved such that it is located at the nearest point in the voice data where no words are spoken. Such a determination may be performed by comparing the current segment boundary to an index describing the locations of words and/or the locations in the voice data where a person is not speaking and moving the boundary to the beginning of the nearest word or to a location in the voice data where a person is not speaking. For example, with respect to the voice message illustrated in FIG. 6, if the word "restaurant" is divided by the boundary of the segment, the boundary may be moved to a location immediately prior to the occurrence of "restaurant" (which would result in restaurant being included in the next segment) in the voice data or to a location immediately subsequent to the occurrence of "restaurant" (which would result in restaurant being included in the current segment).

As illustrated in FIG. 6, the example shows three segments being created for the voice data included in packets 600: first segment 601, second segment 602 and third segment 603. In one example, first segment 601 may be created when the transcription server 304 determines that the first 2 seconds of the voice data has been received (e.g., seconds 0.0 to 2.0 of the voice message). Second segment 602 may be created when the transcription server 304 determines that the second 2 seconds of the voice data has been received (e.g., seconds 2.0 to 4.0 of the voice message). Third segment 603 may be created when the transcription server 304 determines that the third 2 seconds of the voice data has been received (e.g., seconds 4.0 to 6.0 of the voice message). Line 604 represents the amount of time from receipt of the first packet for the transcription server 304 to receive the voice data for the first segment 601. Line 606 represents the amount of time from receipt of the first packet for the transcription server 304 to receive the voice data for the second segment 602. Line 608 represents the amount of time from receipt of the first packet for the transcription server 304 to receive the voice data for the third segment 603. Accordingly, each segment is created at a different time.

Referring again to FIG. 5, at step 505, a segment of voice data may be transcribed to text. Many different techniques may be suitable for converting voice data to text, and any such technique may be used or combined to perform the machine transcription. For example, the transcription server 304 may use a hidden Markov model (HMM) word recognition system that statistically models voice data against a known vocabulary of words. For a particular portion of voice data, the vocabulary word with the highest confidence may be selected as the word for that portion of voice data.

At step 506, text of the segment may be transmitted. In some arrangements, the text of the segment may be transmitted directly to a user device, such as a cell phone or computer of the voice data's intended recipient(s). Additionally or alternatively, the text of the segment could be transmitted to another server that provides a service, such as an e-mail service, to the user. The transmission may be via e-mail, SMS, instant message (e.g., via messages conforming to XMPP) or any other suitable method of transmitting text. In some arrangements, a message conforming to a particular protocol may be created or otherwise prepared by the transcription server 304 (e.g., create a message conforming to SMS; create an e-mail message, etc.). Additionally, the message that includes the text of the segment may also include other information. For example, the message may include information identifying the source of the voice data, such as a name of a person (e.g., "Anthony") a name of an associated event (e.g., "Presentation of Jul. 1, 2011") or phone number. The message may include information identifying the intended recipient(s), such as the recipient's name or phone numbers.

A user or system profile may also include an identification of the preferred transmission methods. For example, a user or system profile may define that a user is to receive text of segments via e-mail only. The user or system profile may also define a listing of communication channels that the text is to be sent over. For example, the user profile could list e-mail and a particular e-mail address and SMS with two telephone numbers. The text of the segment could be transmitted in an e-mail to the particular e-mail address and in two SMS messages, where one SMS message is transmitted to each of the defined telephone numbers.

With respect to the example of FIG. 6, one message may be transmitted for each segment. Message 611 includes the transcribed text of first segment 601. Message 612 includes the transcribed text of second segment 602. Message 613 includes the transcribed text of third segment 603. In some variations, each message may be an e-mail addressed to an intended recipient of the voice message represented by packets 600, or an SMS sent to a telephone number of an intended recipient of the voice message. Line 614 represents the amount of time between creation of the first segment 601 and transmission of message 611. Line 616 represents the amount of time between creation of the second segment 602 and transmission of message 612. Line 618 represents the amount of time between creation of the third segment 603 and transmission of message 613. As illustrated by the example of FIG. 6, transmission of each message may occur at a different time, and a period of time may be between transmission of each adjacent message. Thus, in some instances, upon transmission of message 611, an intended recipient may be able to view message 611 before message 612 and message 613 is transmitted from the transcription server 304.

At step 507, it may be determined whether the data stream has been closed and/or whether the data stream has been idle for a threshold amount of time. The data stream may be considered idle if voice data or some other message (e.g., a message acknowledging that the data stream connection is still alive) has not been received for a threshold amount of time. If the data stream has been closed or is idle, the method may proceed to step 508. Otherwise, the method may return to step 501.

At step 508, it may be determined whether all voice data has been transcribed. If all the voice data has not been transcribed, the method may return to step 504 to create a segment for the remaining amount of voice data that has not been transcribed, transcribe that segment and transmit the text of that segment. If all the voice data has been transcribed, the method may end.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
   after receiving a first amount of data for a voicemail message that is above a first threshold amount, transcribing, by a computing device, a first segment of the voicemail message to first text and transmitting a message that comprises the first text to an intended recipient of the voicemail message; and
   after receiving a second amount of data for the voicemail message that is above a second threshold amount, transcribing a second segment of the voicemail message to second text and transmitting an e-mail that comprises the second text to the intended recipient of the voicemail message.

2. The method of claim 1, wherein the message is an e-mail message, a Short Message Service (SMS) message or an instant message.

3. The method of claim 2, wherein at least a portion of the second amount of data is received while the first segment is being transcribed to the first text.

4. The method of claim 2, wherein transcribing the second segment comprises transcribing the second segment in its own thread.

5. The method of claim 2, wherein the first amount of data for the voicemail message comprises a first amount of uncompressed voice data that is received from a voice data server, and wherein the second amount of data for the voicemail message comprises a second amount of uncompressed voice data that is received from the voice data server.

6. The method of claim 2, wherein the voicemail message conforms to G.711 or G.722.

7. The method of claim 2, further comprising:
   creating, by the computing device, the first segment; and
   creating, by the computing device, the second segment.

8. A method, comprising:
   after receiving a first amount of data for a voicemail message that is above a first threshold amount, transcribing, by a computing device, a first segment of the voicemail message to first text and transmitting a message that comprises the first text to an intended recipient of the voicemail message; and
   after receiving a second amount of data for the voicemail message that is above a second threshold amount, transcribing a second segment of the voicemail message to second text and transmitting a short messaging service (SMS) message that comprises the second text to the intended recipient of the voicemail message.

9. The method of claim 8, wherein the message is an e-mail message, another Short Message Service (SMS) message or an instant message.

10. The method of claim 9, wherein at least a portion of the second amount of data is received while the first segment is being transcribed to the first text.

11. The method of claim 9, wherein transcribing the second segment comprises transcribing the second segment in its own thread.

12. The method of claim 9, wherein the first amount of data for the voicemail message comprises a first amount of uncompressed voice data that is received from a voice data server, and wherein the second amount of data for the voicemail message comprises a second amount of uncompressed voice data that is received from the voice data server.

13. The method of claim 9, wherein the voicemail message conforms to G.711 or G.722.

14. The method of claim 9, further comprising:
   creating, by the computing device, the first segment; and
   creating, by the computing device, the second segment.

15. A method, comprising:
   after receiving a first amount of data for a voicemail message that is above a first threshold amount, transcribing, by a computing device, a first segment of the voicemail message to first text and transmitting a message that comprises the first text to an intended recipient of the voicemail message; and
   after receiving a second amount of data for the voicemail message that is above a second threshold amount, transcribing a second segment of the voicemail message to second text and transmitting an instant message that comprises the second text to the intended recipient of the voicemail message.

16. The method of claim 15, wherein the message is an e-mail message, a Short Message Service (SMS) message or another instant message.

17. The method of claim 16, wherein at least a portion of the second amount of data is received while the first segment is being transcribed to the first text.

18. The method of claim 16, wherein transcribing the second segment comprises transcribing the second segment in its own thread.

19. The method of claim 16, wherein the voicemail message conforms to G.711 or G.722.

20. The method of claim 16, further comprising:
   creating, by the computing device, the first segment; and
   creating, by the computing device, the second segment.

* * * * *

UNITED STATES PATENT AND TRADEMARK OFFICE
CERTIFICATE OF CORRECTION

PATENT NO. : 9,503,582 B2
APPLICATION NO. : 14/820935
DATED : November 22, 2016
INVENTOR(S) : Zhou et al.

Page 1 of 1

It is certified that error appears in the above-identified patent and that said Letters Patent is hereby corrected as shown below:

In the Specification

Column 6, Detailed Description, Line 50:
Please delete "preformed" and insert --performed--

Column 6, Detailed Description, Line 52:
Delete "preformed" and insert --performed--

Column 7, Detailed Description, Line 28:
Delete "305." and insert --304.--

Signed and Sealed this
Twenty-third Day of April, 2019

Andrei Iancu
*Director of the United States Patent and Trademark Office*